June 18, 1963                C. A. WEISE                3,094,251
                          FUEL SUPPLY SYSTEM
Filed May 27, 1960                              2 Sheets-Sheet 1

INVENTOR.
CARL A. WEISE
BY Edwin Coates
ATTORNEY

INVENTOR.
CARL A. WEISE
BY Edwin Coates
ATTORNEY

United States Patent Office 3,094,251
Patented June 18, 1963

3,094,251
FUEL SUPPLY SYSTEM
Carl A. Weise, Pacific Palisades, Calif., assignor to Douglas Aircraft Company, Inc., Santa Monica, Calif.
Filed May 27, 1960, Ser. No. 32,214
3 Claims. (Cl. 222—255)

This invention relates to a fuel supply system, and more particularly to an aircraft fuel supply system having large fuel tanks wherein the fuel load may be shifted during changes in flight attitudes.

The advent of large jet aircraft capable of flying long distances has necessitated the use of relatively large size fuel tanks having capacities of over one thousand gallons. In tanks of this size, the problem of a shifting fuel load during various flight attitudes is encountered when most of the fuel has been consumed and the tank is carrying considerably less than its capacity. For example, in a "wave-off" during descent of the aircraft when the aircraft must regain altitude, the remaining fuel will be displaced to the aft end of the tank and the forward end of the tank may become dry. Therefore, in designing a pump system for transferring the fuel from the tanks to the engines, provision must be made for multiple fuel pickup points within the tanks to insure that the engines will be continually supplied with fuel. In some cases, this has been done by utilizing pumps in both the fore and aft portions of the tank. The present fuel supply system eliminates one of these pumps by utilizing a selector valve which will select one of two remote fuel pickup points in the tank, whichever one is in contact with the liquid.

According to the present invention, the fuel supply system includes a fuel tank, a reservoir box within the fuel tank, an impositive pump such as a centrifugal or axial flow type pump, a shuttle type selector valve connected to the suction side or inlet of the pump, and dual fuel pickup pipes or legs which are attached to the inlets of the selector valve and which extend respectively to the fore and aft portions of the tank. Depending upon the quantity of fuel in the tank and the aircraft attitude, the pickup point of one of these pickup legs may become exposed to air while the other point remains submerged in fuel. When this happens, the selector valve will operate to select the pickup point which remains submerged in the fuel, thus assuring a constant supply of fuel in the box.

These and other features of the fuel supply system of the present invention will be better understood by reference to the accompanying drawings in which.

Figure 1:
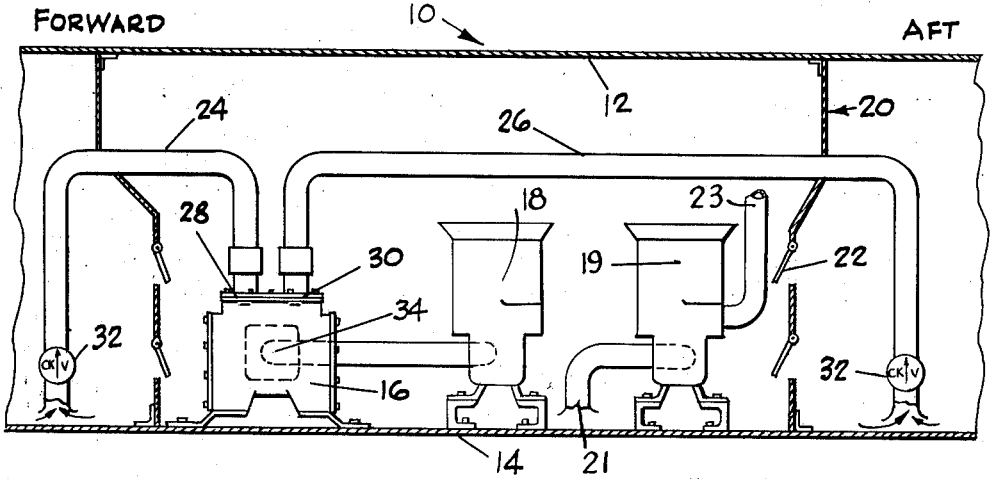
FIGURE 1 is a schematic view of a portion of an aircraft wing and an embodiment of the fuel supply system of the present invention incorporated therein.

FIGURE 1 shows a portion of an aircraft wing 10 with upper and lower surfaces 12, 14 which together with spars and bulkheads (not shown) define an integral fuel tank. Selector valve 16 and associated impositive pump 18 are shown mounted on the lower surface 14 of the tank within the confines of a reservoir box 20 located at or near the low point of the tank. The box is provided with flapper type check valves 22 which permit gravity flow of the fuel into the box but restrain flow out of the box. Pickup pipes or legs 24 and 26 are shown connected respectively to the forward and aft inlets 28 and 30 of selector valve 16. Pipes 24 and 26 extend vertically from the valve and then horizontally near the top of the tank to appropriate points in the forward and aft parts of the tank where they again extend vertically to a pickup point near the tank floor. The pipes have flapper type check valves 32 near the pickup point which permit fuel flow into the box but prevent drainage of fuel from the box when the pump is not operating.

In the operation of the above fuel supply system, the fuel which is picked up through pipes 24 and 26 by pump 18 is discharged into the reservoir box to join fuel which has entered by gravity flow. The reservoir box thus assures continuity of fuel supply to the engine at all times even though there may be a lag in the fuel pickup while the selector valve is moving from one position to another. This movement may take from about twenty seconds to about two minutes, depending upon the operating conditions in the fuel system at the time. A second pump 18 having an inlet 21 and a discharge line 23 leading to the engines may be placed in the reservoir box to pump fuel from the box to the engine, or a pump attached to the engine may be used to draw the fuel from the box. Whichever method is used to transfer the fuel to the engine is dependent upon the ambient pressure and the volatility and temperature of the particular fuel in the system.

Figure 2:
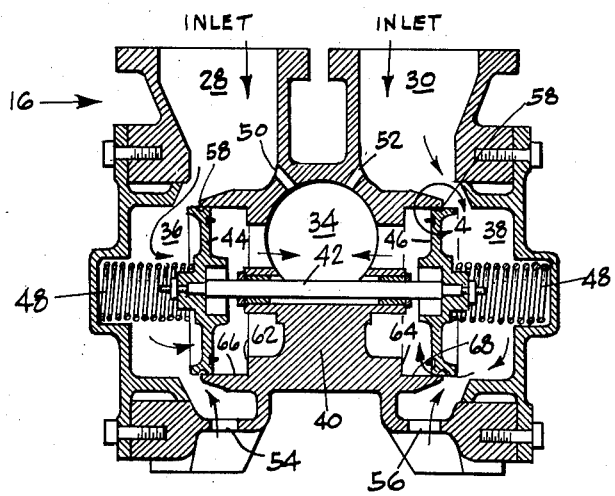
FIGURE 2 is a vertical sectional view of the selector valve of the present invention with the shuttle valve means in the theoretical neutral or balanced position.
Figure 3:
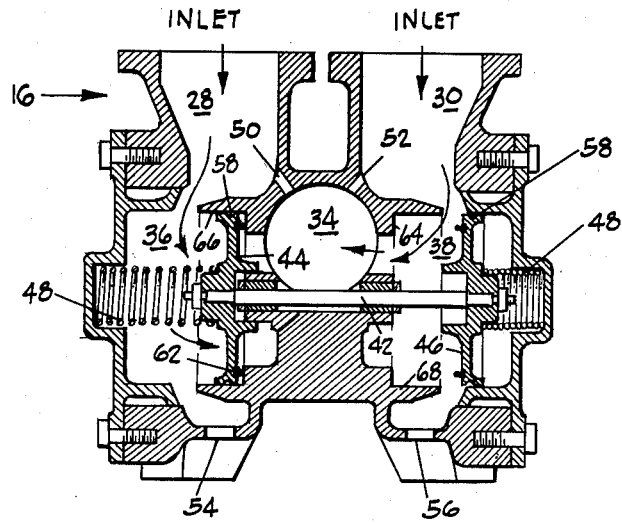
FIGURE 3 is also a vertical sectional view of the selector valve of the present invention, with the shuttle valve means in an offset or selective position.

As more clearly shown in FIGURES 2 and 3, the selector valve 16 of the present invention has vertical inlets 28, 30, an outlet 34 centrally located on one side of the valve housing in perpendicular relation to the inlets, and chambers 36, 38 interconnecting the inlets to the outlet. Basal member 40 of the valve housing carries the shuttle valve means which comprise a shaft 42 axially slidable in the member, disk type cap assemblies 44, 46 mounted on the ends of the shaft, and springs 48 of substantially equal strength which hold the caps in the theoretical neutral position shown in FIGURE 2 when the valve is inoperative and which help to shift the caps when air is introduced in one of the inlets. The valve housing has air vent holes 50, 52 which respectively connect inlets 28 and 30 with outlet 34. Priming holes 54, 56 are provided at the bottom of the housing to maintain pump prime.

In actuality, the theoretical neutral position shown in FIGURE 2 is hardly ever achieved because the valve generally cannot be made exactly symmetrical wherein the opposing shuttle valve means are exact duplicates of the other. Although these parts are made within certain manufacturing tolerances, the likelihood of their being identical is very remote. Therefore, as a practical matter, the valve will be biased to one side or the other, and this fact should be kept in mind when reference is hereinafter made to the "neutral position" in contrast to the offset or selective position when steady flow conditions are established on one side of the valve.

Figure 4:
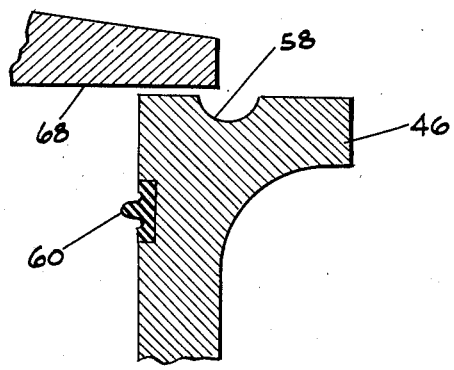
FIGURE 4 is an enlarged sectional view along the line 4—4 in FIGURE 2.

As more clearly illustrated in FIGURE 4, an annular groove 58 is cut into the outer periphery of the caps to increase valve selective sensitivity to pressure differential changes across the cap when the valve is in the neutral position. An annular sealing element 60 is attached to the inner face of each of the caps for closing the chambers when the caps are seated on shoulders 62, 64 of the housing. A small clearance is provided between the outer periphery of the caps and the bore 66, 68 in the housing. The clearance permits fuel flow in the valve when the caps are in the neutral position.

In the operation of the fuel supply system, when the tank is first filled with fuel, the reservoir box also becomes filled by gravity to the same level. The fuel also enters into the valve through priming holes 54, 56; into the pump through outlet 34; and into the pickup legs up to the level in the tank. When the pump is activated, pressure in outlet 34 will be reduced, and fuel and trapped air will be drawn into the outlet from the chambers 36, 38 and from the pickup legs through the clearances between the outer periphery of the caps 44, 46 and the bores 66, 68. The mounting of the shuttle valve means between opposing springs 48 makes the valve means dynamically unstable in its neutral position, i.e. any change in the forces acting on the valve means will cause the latter to hunt or shuttle back and forth until steady or equilibrium flow conditions are established. Such a change in the forces might be brought about by a large air bubble, for example. Now assume that steady flow conditions are about to be reached and the resultant of the various forces in the system causes cap 46 to move slightly outwardly, away from outlet 34. This movement tends to equalize the pressure differential across cap 46. Simultaneously, cap 44 is pulled inwardly in bore 66 whereupon groove 58 causes a labyrinth seal to form, disturbing flow of fuel through the clearance between the outer periphery of cap 44 and bore 66. This now causes a greater pressure drop across cap 44 than across cap 46, and cap 44 will move inwardly to seat on shoulder 62, shutting off flow from inlet 28. Simultaneously, cap 46 is pushed fully outwardly, permitting fuel to flow freely from inlet 30 to the outlet through chamber 38. In the fully open position shown in FIGURE 3, the reduced pressure, or suction, in outlet 34 keeps cap 44 seated on shoulder 62. Also, the valve housing at the junction of inlet 30 and chamber 38 is beveled so as to cause impinging flow of some of the fuel against the inner face of cap 46, thereby helping to maintain the cap in the fully open position. Once this position is established, flow through inlet 30 will continue as long as the pickup point on leg 26 is submerged in fuel.

Now assume that, after considerable fuel has been consumed, the aircraft changes attitude and the pickup point of leg 26 becomes exposed to air. The fuel in the leg will become rapidly exhausted, and air will be introduced into inlet 30 and into outlet 34 through vent hole 52. With the suction reduced and the cessation of impinging flow on cap 46, springs 48 will now force caps 44 and 46 at least back into neutral position, if not beyond it because of the momentum. The valve will again begin to hunt. During this valve shift, vent hole 52 helps to reduce the pressure difference between inlet 30 and outlet 34 and assure that there will always be some fuel in chamber 38 to maintain pump prime. During the shift, the fuel in chamber 38 is replenished by that coming through priming hole 56. Meanwhile, each time cap 44 moves outwardly away from outlet 34, some of the fuel in inlet 28 and chamber 36 is pumped out, and additional fuel is drawn up leg 24. There will usually be some air trapped in leg 24 which will cause slugging (pumping of fuel and air mixture) and valve shifting. The air will gradually be removed and steady flow conditions will be established at which time cap 44 will have moved outwardly and cap 46 will have become seated on shoulder 64 in chamber 38. The interplay of the various forces which results in this position of the valve is difficult to analyze and to explain in detail. Perhaps, it can be summarized by saying that this position is the position of greatest stability for the fuel supply system under the prevailing conditions. It will be evident from the previous discussion that cap 46 cannot remain in its fully open position for very long because any such prolongment will rapidly deplete chamber 38 of fuel and introduce air into outlet 34, thereby bringing about a return movement of the cap. And the dynamic instability of the valve in the neutral position has already been explained. Whatever the theoretical explanation, once the valve has selected the position wherein cap 44 is fully open, the valve will then continue to draw fuel through inlet 28 as long as the pickup point on leg 24 remains submerged in fuel. If there is another change in aircraft attitude and this pickup point becomes exposed to air, the valve will again shift to open inlet 30.

Thus, it will be seen that the fuel supply system of the present invention provides a relatively simple and economical solution to the problem of a shifting fuel load in aircraft. The elimination of a pump by the use of the selector valve of the present invention saves weight, which is an important advantage in aircraft design. Also, maintenance costs are reduced by the use of the selector valve because it does not need to be serviced as frequently as a pump.

Although the presently preferred embodiment of the invention has been shown and described, it is to be understood that the invention is susceptible to variation in form and construction within the scope of the appended claims.

I claim:

1. In an aircraft fuel supply system, a fuel tank, a reservoir box located near the low point of the tank, said box having flapper type valves allowing gravity flow of fuel into the box but restraining gravity flow from the box, a pump mounted in the box, a selector valve mounted in the box and having dual inlets and an outlet, said outlet being connected to the suction side of the pump, dual fuel pickup pipes attached to the inlets of the selector valve and extending respectively to the fore and aft parts of the tank, said selector valve having shuttle valve means to alternatively select whichever pickup pipe is submerged in the fuel when the tank is tilted, a second pump connected for pumping fuel out of the box, and check valves on the pickup legs for preventing drainage of the box when the system is inoperative.

2. A selector valve for a fuel pump comprising a housing; dual substantially vertical inlets; a substantially horizontal outlet centrally located in a side of the housing and adapted for connection to the suction side of the fuel pump; dual horizontally disposed chambers in the housing interconnecting the inlets with the outlet; valve means in the chambers for controlling flow from the inlets to the outlet and for alternatively selecting whichever one of the inlets is in continual contact with the fuel; said valve means including a shaft supported in the housing for axial movement; spring-biased poppet type cap assemblies mounted in opposing relationship on each end of the shaft; said caps having a diameter less than the diameter of the chambers, an annular groove in the outer periphery, and an annular sealing element on the inside face for restraining flow in the chamber when the cap seats; and air vent holes connecting the inlets with the outlet and pump priming holes at the base of the housing for maintaining a fuel head in whichever chamber becomes exposed to air.

3. A selector valve for a fuel pump comprising: a housing having dual fuel inlets, a centrally disposed fuel outlet, and dual chambers interconnecting the inlets with the outlet; spring-biased shuttle valve means seating in the chambers and being adapted to alternatively select whichever one of the inlets is in contact with the fuel, said valve means being grooved at the periphery to impede fuel flow between the periphery and the chamber walls and thereby increase the selective sensitivity of the valve means; and air vent holes connecting the inlets with the outlet and pump priming holes at the base of the housing for maintaining a fuel head in whichever chamber becomes exposed to air.

References Cited in the file of this patent

UNITED STATES PATENTS

| | | |
|---|---|---|
| 868,680 | Martin | Oct. 22, 1907 |
| 1,845,136 | Dieter | Feb. 16, 1932 |
| 2,239,098 | Hunter | Apr. 22, 1941 |
| 2,332,007 | Parker | Oct. 19, 1943 |
| 2,395,661 | Heckert | Feb. 26, 1946 |

FOREIGN PATENTS

| | | |
|---|---|---|
| 141,469 | Australia | June 7, 1951 |